United States Patent [19]

Fu et al.

[11] Patent Number: 5,390,311

[45] Date of Patent: Feb. 14, 1995

[54] METHOD AND APPARATUS FOR ACCESSING MICROCODED INSTRUCTIONS IN A COMPUTER SYSTEM

[75] Inventors: Beatrice P. Fu, Mountain View; Benny Eitan, Sunnyvale, both of Calif.

[73] Assignee: Intel Corporation, Santa Clara, Calif.

[21] Appl. No.: 117,241

[22] Filed: Sep. 7, 1993

Related U.S. Application Data

[63] Continuation of Ser. No. 815,566, Dec. 26, 1991, abandoned, which is a continuation of Ser. No. 308,041, Feb. 8, 1989, abandoned.

[51] Int. Cl.[6] .............................................. G06F 9/26
[52] U.S. Cl. ........................... 395/400; 364/251.2; 364/252.6; 364/255.4; 364/255.1; 364/DIG. 1
[58] Field of Search .................. 395/800, 400, 375

[56] References Cited

U.S. PATENT DOCUMENTS

| | | | |
|---|---|---|---|
| 3,949,370 | 4/1976 | Reyling | 364/200 |
| 3,959,783 | 5/1976 | Fressineau | 364/200 |
| 3,988,717 | 10/1976 | Kisylia | 364/200 |
| 4,171,536 | 10/1979 | Heuer | 364/200 |
| 4,236,206 | 11/1980 | Strecker | 364/200 |
| 4,330,823 | 5/1982 | Retter | 395/375 |
| 4,363,091 | 12/1982 | Pohlman | 364/200 |
| 4,403,284 | 9/1983 | Sacarisen | 364/200 |
| 4,450,519 | 5/1984 | Guttag | 364/200 |
| 4,484,260 | 11/1984 | Blahut | 364/900 |
| 4,484,274 | 11/1984 | Berenbaum | 364/200 |
| 4,493,029 | 1/1985 | Thierbach | 364/200 |
| 4,542,453 | 9/1985 | Patrick | 364/200 |
| 4,713,750 | 12/1987 | Damouny | 364/200 |
| 4,751,703 | 6/1988 | Picon | 371/10 |
| 4,864,535 | 9/1989 | Rogers | 365/94 |
| 4,876,640 | 10/1989 | Shankar | 364/200 |
| 4,878,174 | 10/1989 | Watkins | 364/200 |
| 5,032,983 | 7/1991 | Fu | 395/375 |

Primary Examiner—Eric Coleman
Attorney, Agent, or Firm—Blakely, Sokoloff, Taylor & Zafman

[57] ABSTRACT

A microprogrammed computer system having means for reducing entry point table size. The present invention describes a microprogrammed computer system in which opcodes are grouped and each group is mapped to a common entry point address in a microcode sequence memory. The actual microcodes for the instructions within the group are evenly distributed with the block and differentiated by opcode bits. The present invention discloses segmenting a microprogram and utilizing micro-jumps, as appropriate, to utilize the available microcode space. Utilizing the structure of the present invention reduces the number of required inputs to a PLA or similar means for generating entry points and further increases circuit speed and reduces entry point table size.

22 Claims, 3 Drawing Sheets

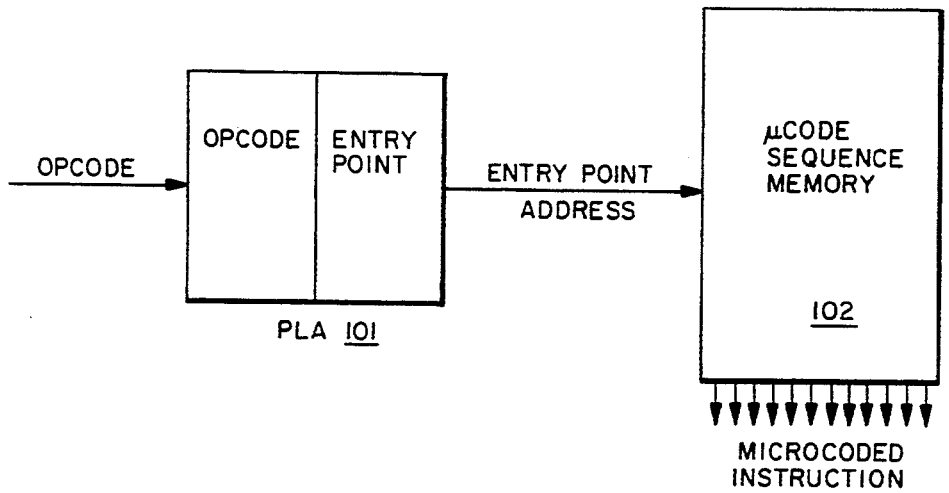
FIG_1 (PRIOR ART)
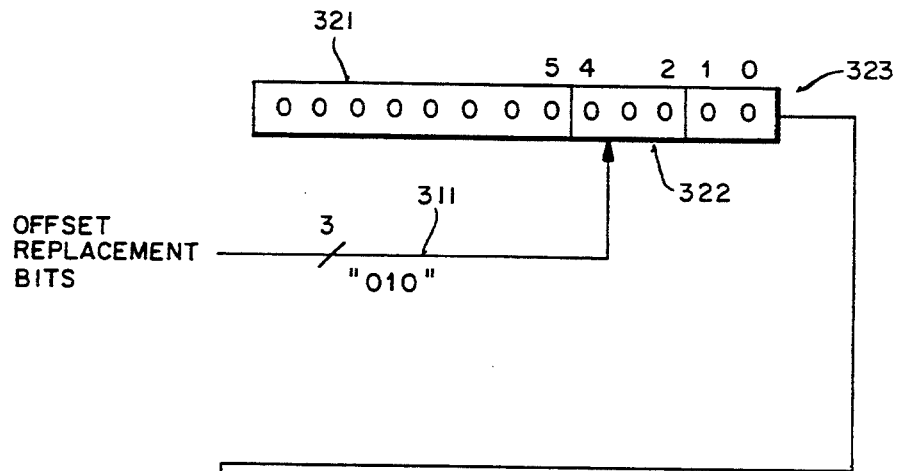
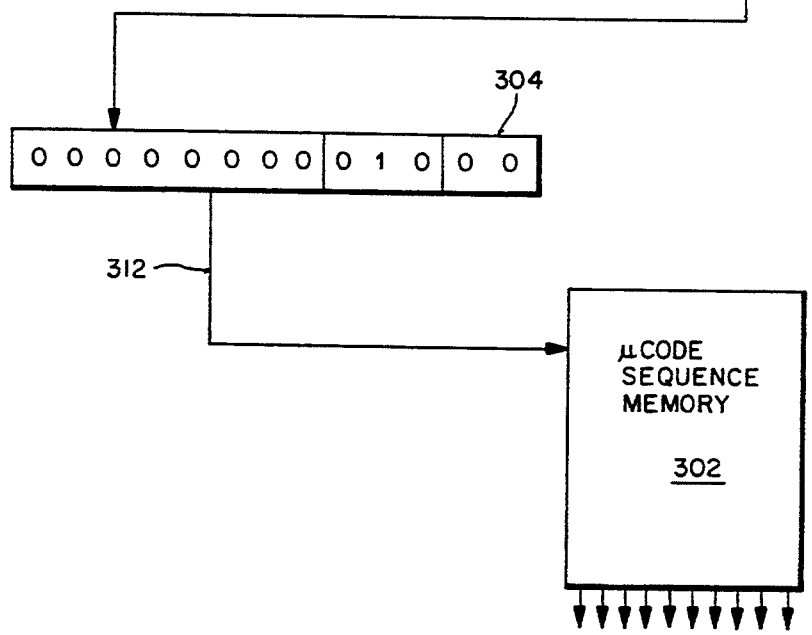
FIG_3

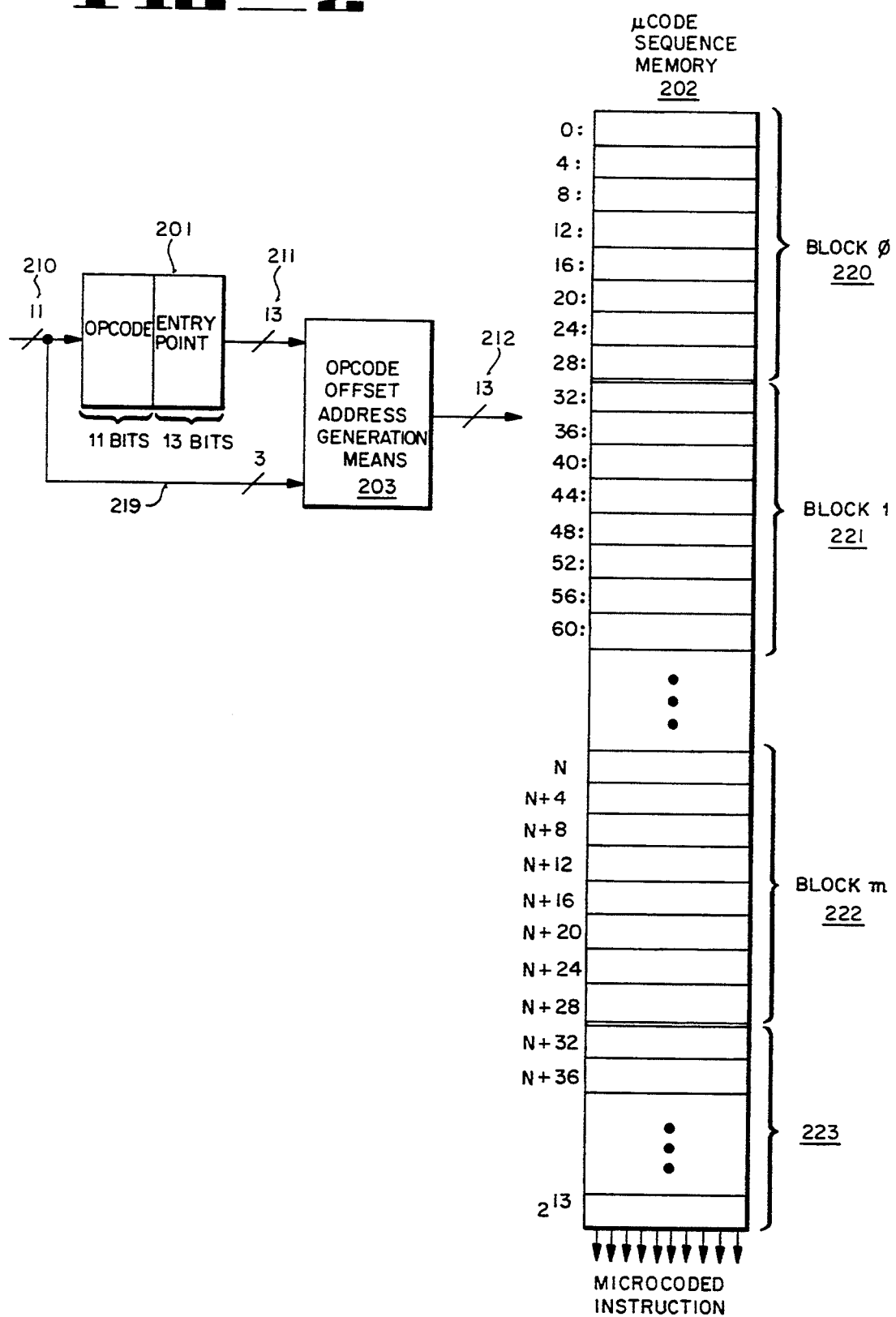
FIG_2

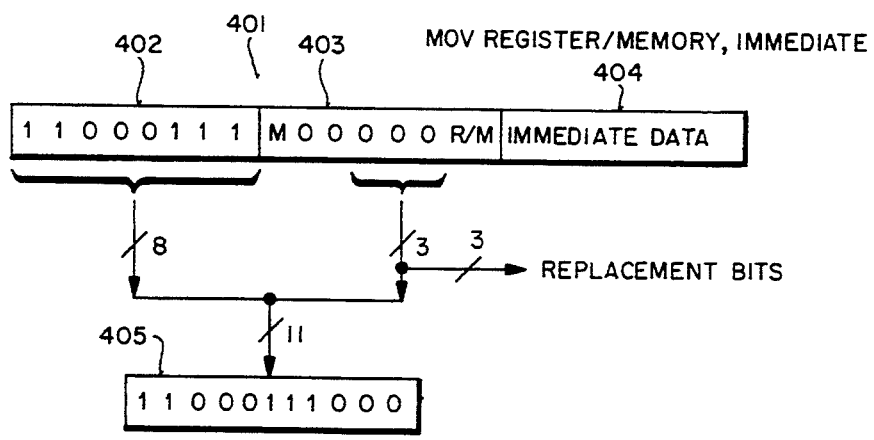
FIG_4A
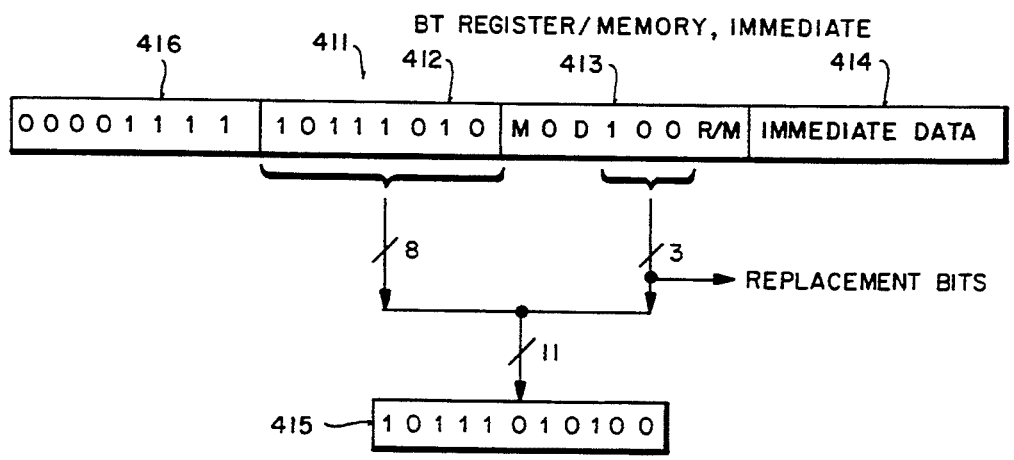
FIG_4B

METHOD AND APPARATUS FOR ACCESSING MICROCODED INSTRUCTIONS IN A COMPUTER SYSTEM

This is a continuation of application Ser. No. 07/815,566, filed Dec. 26, 1991, now abandoned, which is a continuation of application Ser. No. 07/308,041, filed Feb. 8, 1989, now abandoned.

BACKGROUND OF THE INVENTION

1. Field of the Invention

The present invention relates to the field of microcode for computer systems, and, more specifically to an apparatus and method for reduction of the address table size required for accessing microcode entries.

2. Description of the Related Art

Many modern day computer systems utilize microcode to generate control signals for the computer systems. Such microcoded systems are described in Wilkes, M. V., *The Growth of Interest in Microprogramming: A Literature Survey*, Computing Surveys, vol. 1, pp. 139-145, September, 1969.

In general, microcoded computer systems comprise a memory means, such as a read-only memory (ROM), to store microcoded instructions. The microcoded instructions are stored in the memory device with each sequence of microcoded instructions having some defined entry point. A means for determining the entry point of any microcoded sequence corresponding to a given opcode is then provided.

For example, with reference to FIG. 1, a prior art microcoded system is illustrated. In this system, an opcode or macro-instruction is received by a programmed logic array (PLA) circuit 101. The PLA 101 produces, as an output, an entry point address into a microcode sequence memory 102 corresponding to the requested opcode.

The Intel 80386 microprocessor produced by Intel Corporation of Santa Clara, California is an example of such a prior art microcoded computer system.

In such systems, each opcode (macro-instruction) must be mapped by the PLA, or similar device, into an entry point address. As the number of opcodes in a computer system increases, the table size in the look-up device (PLA) becomes large.

It is therefore a primary object of the present invention to develop a system which reduces the table size required for look-up of entry points in a microcoded computer system.

SUMMARY OF THE INVENTION

A microcoded computer system having a reduced size microcode entry point look-up table is described. The present invention comprises a computer system having an entry point address generation means for generating entry points into a microcode sequence memory. In the preferred embodiment, the entry point address generation means comprises a programmed logic array circuit, although it will be obvious to one of ordinary skill in the art that alternate means may be utilized.

The computer system of the present invention further comprises a microcode memory, preferably a read-only memory (ROM) means. The present invention discloses grouping opcodes (macroinstructions) and mapping each group to a common entry point of the microcode ROM. The microcode memory is then defined as comprising a plurality of blocks, each block addressed by one of the common entry points. Within each block, microcode instructions corresponding to opcodes within the group are evenly distributed.

The present invention further comprises means for replacing selected bits of the entry point address to allow addresses to directly address microcode instructions corresponding to requested opcodes. In the preferred embodiment, each block is 32 lines long. Bits 2, 3 and 4 of the entry point address are replaced from operation code bits. This allows addressing of 8 microcoded instructions of 4 lines each. In the preferred embodiment, a line comprises 47 bits of information.

The present invention further provides for microcode instructions which require more than 4 lines to have a jump instruction at the end of the 4 line sequence. The next microcode instruction is then read from the jump target location. In the preferred embodiment, a delayed jump scheme is used. The jump instruction is placed at the next to last, rather than the last instruction, allowing execution of the last instruction after receiving the jump instruction. This scheme provides for fetch ahead processing in computer systems having pipeline architectures.

BRIEF DESCRIPTION OF THE DRAWINGS

FIG. 1 is a block diagram illustrating a known prior art microcoded system.

FIG. 2 is a block diagram illustrating a microcoded system of the present invention.

FIG. 3 is a diagram illustrating the method of replacing selected bits in an entry point address as may be utilized by the present invention.

FIG. 4(a) is an illustration of a first opcode having replacement bits as may be utilized by the present invention.

FIG. 4(b) is an illustration of a second opcode having replacement bits as may be utilized by the present invention.

DESCRIPTION OF THE PREFERRED EMBODIMENT

A microcoded computer system is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

The present invention comprises a microcoded computer system having an improved organization of the microcode sequence memory which reduces required space in a entry point look-up table.

The present invention comprises a opcode offset address generation means for generating offsets within an address group in a microcode sequence memory. The offset is used to address microcode for the requested opcode.

The preferred embodiment of the present invention is proposed for implementation in the next generation of the Intel 80x86 family of microprocessors (commonly referred to as the Intel 80486).

Referring first to FIG. 2, the present invention discloses an entry point generation means 201 for generating entry point addresses into a microcode sequence memory 202. The entry point address generation means 201 is coupled to receive at least one of the bits of an operation code ("opcode") on line 210 and provides as an output an entry point address on line 211.

In the preferred embodiment, entry point generation means 201 comprises a programmed logic array (PLA) circuit. However, it will be obvious to one of ordinary skill in the art that the present invention may be practiced utilizing alternate means such as read-only memories (ROMs), random access memories (RAMs), etc.

In the preferred embodiment, the input to the entry point address generation means 201 on line 210 comprises eleven bits of information. The eleven bits of information are selected from the operation code as exemplified with reference to FIGS. 4(a) and 4(b). In general, the preferred embodiment discloses two types of operation code instructions which utilize the present invention: (1) "one-byte" opcode instructions and (2) "two-byte" opcode instructions. As will be seen with reference to FIGS. 4(a) and 4(b), one-byte opcode instruction utilizing the present invention comprise a one byte opcode and a second byte indicating addressing mode and register information as well as any necessary operands.

Referring first to FIG. 4(a), a MOV register/memory, immediate (move register or memory from immediate) instruction 401 is illustrated. The MOV register/memory, immediate instruction 401 is an example of a "one-byte" opcode; the opcode byte comprising the 8 bits indicated as bits 402. In addition, a second byte 403 is utilized for addressing mode and register information. Bits 0–2 are used for register information and bits 6–7 are used for addressing mode information. Bits 3–5 are additional opcode bits. Finally, an operand 404 is associated with the opcode. In the preferred embodiment, the 8 bits from the opcode byte 402 and bits 3–5 of byte 403 are combined as 11 bits 405 used for addressing the entry point address generation means 201 of on line 210 of FIG. 2. As will be discussed in more detail with reference to FIG. 3, bits 3–5 of byte 403 are also used as replacement offset bits in the entry point address.

Referring to FIG. 4(b), a BT register/memory immediate (test bit register or memory, immediate) instruction 411 is illustrated. The BT register/memory immediate instruction 411 is an example of a "two-byte" opcode; the opcode bytes comprising a first byte indicated as the 8 bits 416 and a second byte indicated as the 8 bits 412. In addition, a third byte 413 is provides addressing mode and register information similar to byte 403 of FIG. 4(a). Bits 3–5 of byte 413 are utilized as part of the opcode. Finally, operand information 414 is associated with the opcode. The 8 bits of byte 412 and bits 3–5 of byte 413 are combined to provide 11 bits 415 for addressing the entry point address generation means 201 as described above in connection with FIG. 4(a). Further, bits 3–5 are utilized as replacement bits for the offset address as discussed in connection with FIG. 4(a).

In certain floating point instructions of the preferred embodiment, bits 0–2 of the addressing mode/register byte (illustrated as byte 403 of FIG. 4(a)) are used, in place of bits 3–5, for replacement bits in the offset address. Bits 0–2 continue to be used for addressing the entry point address generation means 201.

The entry point address output from the entry point address generation means 201 on line 211 comprises thirteen bits of information.

The entry point address generation means 201 is coupled with the microcode sequence memory 202 through an opcode offset address generation means 203. The entry point address output by the entry point address generation means 201 on line 211 is coupled as a first input to the opcode offset address generation means 203. The offset address generation means 203 is further coupled to receive three bits of opcode information on line 219. In the preferred embodiment, the three bits show as replacement bits in FIGS. 4(a) and 4(b) are provided on line 210. In the preferred embodiment of the present invention, the offset address generation means 203 comprises circuitry for replacing three of the bits of the entry point address with the three bits from the opcode provided on line 219.

Although the preferred embodiment of the present invention replaces (or "jams") three bits of the entry point address with three bits from the opcode, it will be obvious to one of ordinary skill in the art that alternative methods may be employed for replacement of selected bits in the entry point address. For example, selected bits from the opcode may be utilized to address a RAM or other memory device storing the replacement bits.

Opcode address generation means 203 provides an entry point address on line 212 comprising 13 bits of information. Line 212 is coupled with microcode sequence memory 202 for providing the entry point address for addressing memory 202. The generation of the 13 bits appearing on line 212 will be described in more detail with reference to FIG. 3.

Microcode sequence memory is organized in plurality of groups such as block 0 220, block 1 221, block 2 222 and memory area 223. Each of the blocks 220-222 comprise a plurality of segments. Each segment contains microcode instructions for a single opcode.

In the preferred embodiment, each segment is 4 lines long and each block is 32 lines long. In the case of a sequence of microcode instructions for a given opcode being 4 lines long or shorter, the entire sequence of microcoded instructions can fit in a single segment. In the case of a sequence of microcoded instructions which is greater than 4 lines in length, a jump instruction may be used at the end of the instructions in the 4 line segment. The jump instruction controls access to the microcoded instructions such that the next microcoded instruction is stored in and read from area 223.

In the preferred embodiment, a delayed jump instruction is utilized. The delayed jump instruction of the preferred embodiment is placed as the next to last instruction in the segment. The instruction following the delayed jump instruction (the final instruction in the 4 line segment) is executed and the jump to area 223 is then executed. This allows a fetch ahead instruction mechanism to be utilized in fetching instructions from the microcoded memory.

It has been found in development of the preferred embodiment that a 4 line segment is optimal for use with the processor of the preferred embodiment. A longer segment leads to unused space in the microcode sequence memory. A shorter segment leads to an excessive number of jumps.

Referring now to FIG. 3, addressing the microcode sequence memory will be described in more detail. An entry point address 301 is received by the opcode offset address generation means 203 of FIG. 2 from the entry point address generation means 201 of FIG. 2. The opcode offset address generation means 203 further receives a three bit offset value on line 311. In the preferred embodiment, the three bit offset value is selected as described in connection with FIGS. 4(a) and 4(b).

As illustrated by FIG. 3, an offset value is supplied on line 311. The offset value is used to replace bits 2, 3 and 4 322 of the entry point address 301 supplied from the PLA. Bits 0 and 1 323 and bits 5-12 321 remain unchanged. In the illustrated example, the offset value supplied on line 311 is "010".

It is obvious that, in alternate embodiments, other bits could be selected for replacement in the entry point address 301. For example, bits 3, 4 and 5 could be selected for replacement. This would lead to an implementation having a block size of 64 lines and a segment size of eight lines.

The modified entry point address 304 is supplied on line 312 (corresponding to line 212 of FIG. 2) for addressing the microcode sequence memory 302 (corresponding to microcode sequence memory 202 of FIG. 2).

Thus, a microcoded computer system is decried. Although the present invention has been described with specific reference to a number of details of the preferred embodiment, it will be obvious that a number of modifications and variations may be employed without departure from the scope and spirit of the present invention. Accordingly, all such variations and modifications are included within the intended scope of the invention as defined by the following claims.

We claim:

1. A microprogrammed computer system comprising:
   (a) an entry point generation means for receiving an opcode and generating a base entry point address into a first memory means;
   (b) said first memory means for storing microcoded instructions, said first memory means organized into a plurality of segments and an instruction overflow area, a first segment for storing a plurality of contiguously stored microcoded instructions for a first opcode, said first segment having N lines and an address location X, a second segment contiguous with said first segment, said second segment for storing a plurality of contiguously stored microcoded instructions for a second opcode, said second segment having N lines and an address location X+N, said instruction overflow area for storing microcoded instructions for said first opcode, said instruction overflow area noncontiguous with said first segment; and
   (c) offset address generation means coupled to said entry point generation means and further coupled to an input line, said input line for providing an opcode, said offset generation means for receiving at least one bit of said opcode and replacing a corresponding number of selected bits in said base entry point address as a function of said at least one opcode bit to create an entry point address into said first memory means for said opcode provided over said input line.

2. The microprogrammed computer system as recited by claim 1 wherein said offset address generation means is coupled to said input line to receive three input bits of said opcode for replacing three selected bits in said entry code address.

3. A microprogrammed computer system comprising:
   (a) an entry point generation means for generating an entry address into a memory means, said entry point generation means having as an input at least one bit of an opcode;
   (b) opcode offset generation means coupled with said entry point generation means and further coupled to an input line, said input line providing at least one bit of an opcode, said opcode offset generation means for replacing selected bits of said entry point address with said at least one bit of an opcode creating a modified entry point address;
   (c) said memory means for storing microcoded instructions coupled with said opcode offset generation means.

4. The microprogrammed computer system as recited by claim 3 wherein said memory means is organized into a plurality of segments, each of said segments for storing n lines.

5. The microprogrammed computer system as recited claim 4 wherein said entry point address comprises thirteen bits.

6. The microprogrammed computer system as recited by claim 5 wherein said selected bits comprises bits numbered 2, 3 and 4 of said thirteen bits of said entry point address.

7. In a microcoded computer system having a microcode sequence memory for receiving an entry point address from an entry point address generation means, an improvement wherein:
   said microcoded computer system further comprises an opcode offset generation means coupled to said entry point address generation means, said opcode offset generation means further coupled to an input line, said input line providing an opcode, said opcode offset generation means for replacing bits from said entry point address with bits from said opcode providing as an output a modified entry point address; and
   said microcode sequence memory receives said modified entry point address and further comprises a plurality of blocks of microcoded instructions.

8. The improvement as recited by claim 7 wherein each of said plurality of blocks comprises a plurality of segments for storing microcoded instructions for a single operation code.

9. A method for addressing a microcode sequence memory comprising the steps of:
   (a) receiving an operation code;
   (b) determining an entry point address to a microcode memory means based on said operation code;
   (c) replacing selected bits of said entry point address with a set of bits from said operation code yielding a modified entry point address;
   (d) addressing said microcode memory means with said modified entry point address.

10. The method as recited by claim 9 wherein said step of creating a modified entry point is comprised of replacing selected bits of said entry point address with said offset.

11. The method as recited by claim 10 wherein said entry point address comprises 13 bit and said selected bits comprise bits 2, 3, and 4 of said 13 bits.

12. A microprogrammed computer system including a processor, display, RAM, disk storage and a ROM memory for storing microcode instructions, a circuit for generating an opcode address location in said ROM memory comprised of:
   a first input line coupled to a base address generation means, said input line providing an opcode;
   said base address generation means further coupled to an opcode offset generation means, said base address generation means for providing a base address of a location in said ROM to said offset generation means;

a second input line coupled to said opcode offset generation means, said second input line providing a plurality of bits of said opcode to said opcode offset generation means;

said opcode offset generation means for replacing selected bits of said base address from said base address generation means with said plurality of bits from said second input line to create said opcode address location.

13. A microprogrammed computer system comprising:
   (a) entry point generation means for generating an entry point address from an opcode, said address for accessing microcoded instructions stored in a memory means, said entry point generation means further comprising:
      base entry point generation means for generating a base entry point address from said opcode;
      extraction means for extracting one or more bits from said opcode; and
      bit jamming means for replacing a predetermined number of bits from said base entry point address with said one or more extracted bits of said opcode to provide said entry point address;
   (b) said memory means organized in a plurality of blocks and an instruction overflow area, each of said blocks comprised of n contiguous segments, each of said n contiguous segments having m lines for contiguously storing microcoded instructions for a single opcode, and said instruction overflow area for storing additional microcoded instructions for opcodes requiring greater than m lines; and
   (c) means for associating a segment having the first m lines of an opcode requiring greater than m lines with a portion of said instruction overflow area containing the additional microcode instructions for said opcode.

14. A microprogrammed computer system comprising:
   means for receiving an opcode instruction, said opcode instruction having a first format;
   a first memory means for storing microcode instructions for each of said opcode instructions;
   entry point generation means coupled to said means for receiving an opcode instruction having said first format, said entry point generation means for generating an entry address into said first memory means based on said opcode instruction, said entry point generation means further comprised of:
   a second memory means for storing entry addresses into said first memory means;
   index generation means coupled to said second memory means, said index generation means for generating an index into said second memory means from an opcode instruction having said first format;
   retrieval means coupled to said index generation means, said retrieval means for retrieving an entry address from said second memory means based on an index; and
   jamming means coupled to said retrieval means, said jamming means for modifying a retrieved entry address as a function of at least one bit of said opcode instruction to create an entry address into said first memory means for said opcode instruction having said first format.

15. The computer system as recited in claim 14 wherein said first format has a first set of opcode bits that are non-contiguous with a second set of opcode bits.

16. The computer system as recited in claim 15 wherein said index generation means is further comprised of means for combining a portion of said first set of opcode bits with said second set of opcode bits to create said index into said second memory means.

17. The computer system as recited in claim 15 wherein said jamming means is further comprised of means for replacing a predetermined portion of a retrieved entry address with said second set of opcode bits.

18. The computer system as recited in claim 14 wherein said first format has a first field of at least one byte of opcode bits, a second field comprising N opcode bits and first opcode operand data, and a third field comprising second opcode operand data.

19. The computer system as recited in claim 18 wherein said index generation means is further comprised of means for combining a byte of opcode bits of said first field with said N opcode bits of said second field.

20. The computer system as recited in claim 19 wherein said jamming means is further comprised of means for replacing N bits of a retrieved entry address with said N bits of said second field.

21. The computer system as recited in claim 20 wherein N=3.

22. The computer system as recited in claim 21 wherein said entry point address comprises thirteen bits and said N bits of said entry address are bits 2, 3 and 4.

* * * * *